United States Patent
Hirschfelder et al.

(10) Patent No.: US 6,541,934 B1
(45) Date of Patent: Apr. 1, 2003

(54) ELECTRIC DRIVE CONTROL

(75) Inventors: Klaus Hirschfelder, Herbertshausen (DE); Christian Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/784,101

(22) Filed: Feb. 16, 2001

(30) Foreign Application Priority Data

Apr. 12, 2000 (DE) .......................................... 100 18 193

(51) Int. Cl.[7] .............................................. G05B 11/36
(52) U.S. Cl. ........................ 318/609; 318/560; 318/567; 318/671; 318/672; 123/339.1; 123/339.14; 123/349; 123/350
(58) Field of Search ................................ 318/609, 610, 318/560, 567, 671, 672; 123/339.1, 339.14, 339.25, 339.28, 349, 350

(56) References Cited

U.S. PATENT DOCUMENTS

| | | | |
|---|---|---|---|
| 3,510,738 A | | 5/1970 | Iverson ......................... 318/18 |
| 3,975,669 A | | 8/1976 | Tyler .......................... 318/624 |
| 4,408,148 A | | 10/1983 | Herzog ........................ 318/610 |
| 4,474,154 A | * | 10/1984 | Henning et al. ............. 123/339 |
| 5,520,146 A | * | 5/1996 | Hrovat et al. ............... 123/336 |
| 5,669,351 A | * | 9/1997 | Shirai et al. ............ 123/339.21 |
| 5,765,528 A | * | 6/1998 | Kamimaru ............. 123/339.19 |
| 6,019,085 A | * | 2/2000 | Sato et al. ............. 123/339.22 |
| 6,041,264 A | | 3/2000 | Wruck et al. .................. 700/40 |
| 6,109,237 A | * | 8/2000 | Pels et al. ............. 123/339.19 |
| 6,116,216 A | * | 9/2000 | Wright et al. ................ 123/399 |

FOREIGN PATENT DOCUMENTS

| | | |
|---|---|---|
| DE | 32 14 518 C2 | 4/1982 |
| DE | 43 21 286 A1 | 6/1993 |
| DE | 197 11 979 A1 | 3/1997 |
| EP | 0957239 | 11/1999 |

OTHER PUBLICATIONS

Copy of search report.

* cited by examiner

Primary Examiner—Marlon T. Fletcher
Assistant Examiner—Rina I. Duda
(74) Attorney, Agent, or Firm—Crowell & Moring LLP

(57) ABSTRACT

In a method for controlling an electric drive, a controlled variable is adjusted to a desired value. To protect the electric drive, the controlled variable is first adjusted to the desired value in a precise manner. Thereafter, the control operation is interrupted, AND the difference between the controlled variable and the desired value is check continuously to see whether it exceed a preset threshold. Interruption of the control operation is terminated when the threshold has been reached or exceeded.

10 Claims, 1 Drawing Sheet

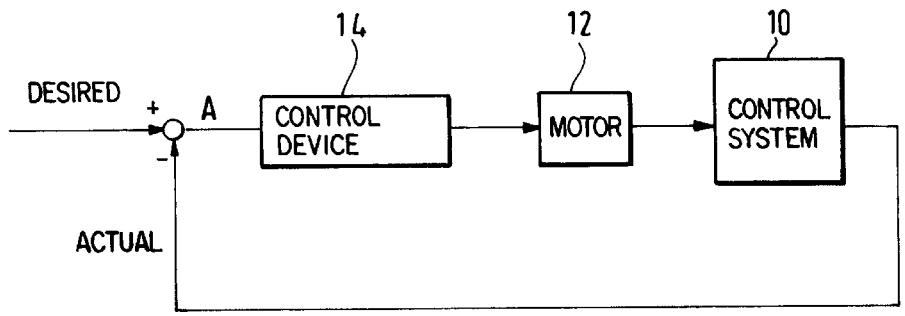
FIG.1
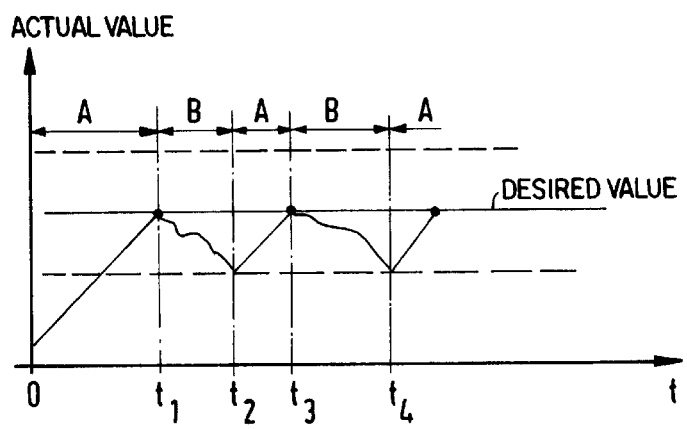
FIG.2
FIG.3
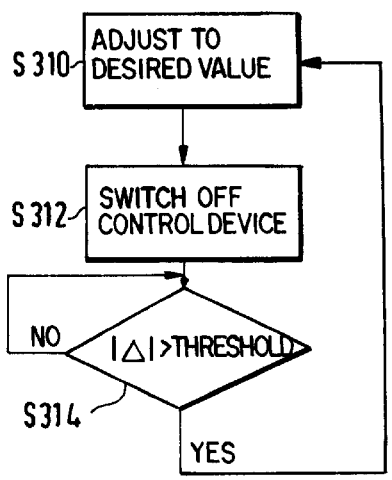
FIG.4
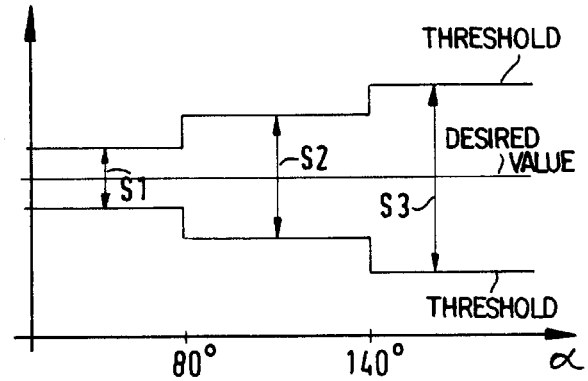

ELECTRIC DRIVE CONTROL

BACKGROUND AND SUMMARY OF THE INVENTION

This application claims the priority of German patent document 100 18 193.7, filed Apr. 12, 2000, the disclosure of which is expressly incorporated by reference herein.

The invention relates to a method for controlling an electric drive, in which a controlled variable (actual value) is adjusted to a desired value.

Basically, two types of control systems are known, specifically discontinuous and continuous control systems. Discontinuous control systems comprise, for example, two-position and three-position controllers. Continuous control systems comprise proportionally operating controllers (P-controllers), integrally operating controllers (I-controllers), proportionally-integrally operating controllers (PI-controllers) or derivative action controllers (PD- and PID-controllers).

Concerning the general prior art, reference is made to the textbook with the title "Introduction to Control Engineering" by Mann/Schiffelgen, 5th Edition, 1986.

However, in many applications, particularly in connection with electric drives, the actuator can become overloaded during constant and continuously implemented control. In electric drives, in particular, overheating can take place.

Such a thermal overstressing may occur, for example, during force transmission via a worm gear. When the sign preceding the load moment changes, the play inherent in the worms gear causes a backlash of teeth to be passed through. If the amplitude of this movement is sufficiently large that it is detected by an actual-value generator, a permanent control movement takes place which supplies energy for a change of sign preceding the moment to an actuating drive. In this manner, the actuating drive is overloaded on a short-term or medium-term basis.

In order to solve these problems, it has been suggested in the case of timed electric drives to guide the timing ratio toward zero when, in a first alternative, the cycle length itself is below a certain limit or when the deviation of the actual value from a desired value is within certain limits. By defining a timing ratio of zero, the controller is in fact switched off within a defined time period, during which the electric drive can recuperate.

However, both of the two methods have the disadvantage that either the desired value to be adjusted is not reached or that, when the controller is switched back on, breakaway forces are more or less taken into account. This is occurs, for example, when the controller is not switched back on before the pulse widths of a pulse-width modulation exceed a defined limit value.

One object of the present invention is to provide a control method which approaches a desired value as precisely as possible.

Another object of the invention is to provide such a control method which also ensures thermal protection of an electric drive.

These and other objects and advantages are achieved by the control method according to the invention, in which the desired value is approached (at least with respect to points) in an essentially precise manner in a first step. After the desired value has been reached, control operation is interrupted, so that no adjusting signal is supplied to the electric drive and continuous readjustment does not take place. The electric drive will be protected as a result of this interruption. In particular, thermal overheating can thereby be avoided.

During the interruption of the control operation, the difference between the controlled variable and the desired value is checked continuously to see whether it exceeds or reaches a defined amount, specifically a threshold. If so, the interruption of control operation is terminated and the controlled variable (actual value) is again adjusted to the defined desired value.

The method of operation according to the invention is particularly advantageous for electric drives with a slow drift of the actual value, which essentially corresponds to a relatively good self-locking. A field of application will therefore be, for example, the adjustment of a valve stroke in the case of a charge cycle valve of an internal-combustion engine by means of an electric drive. In such a drive, power is transmitted by way of a worm gear which has a relatively good self-locking property.

Proportionally operating controllers, integrally operating controllers or derivative controllers or controllers of a combination of the above-mentioned control properties can be used as the control devices. It is also possible to change the threshold dynamically, thus the distance from the desired value with respect to the amount. These dynamics can be geared to vehicle operating parameters, in which case the vehicle operating conditions have an influence on this threshold. According to a particularly simple embodiment, it is possible to find the threshold values in a characteristic curve or a characteristic diagram in which they are filed as a function of one or several operating values.

Other objects, advantages and novel features of the present invention will become apparent from the following detailed description of the invention when considered in conjunction with the accompanying drawings.

BRIEF DESCRIPTION OF THE DRAWINGS

FIG. 1 is a block diagram of a control system for explaining an embodiment of the method according to the invention;

FIG. 2 is a diagram which shows the actual value as a function of time, and thereby the control behavior;

FIG. 3 is a simple flow chart for adjustment of a first control variable; and

FIG. 4 is a diagram which illustrates a threshold to be dynamically selected as a function of an operating parameter.

DETAILED DESCRIPTION OF THE DRAWINGS

The invention will now be described with reference to an embodiment in which an electric motor is used to adjust a variable valve stroke in a charge cycle valve of an internal-combustion engine. The magnitude of the valve opening is controlled according to the angle of rotation of the electric motor.

A simple block diagram or a signal flow chart for such a method of application is illustrated in FIG. 1. In this case, the charge cycle valve represents a control system, in which the controlled variable is set by a motor 12 in the form of an electric drive. The motor 12, in turn, is provided with an electric adjusting variable by a control device 14, and influences the controlled variable based thereon. The control device 14 determines the adjusting variable as a function of a value A, which is obtained as the difference between the actual value (actual) and the desired value (desired). In the present case, the control device may be a P-, I-, D-, PI- or PID controller, all of which are known per se. The type of control is not important in this case. It is decisive, however, that the control device is operated only at certain times, as explained below.

FIG. 3 illustrates that first the actual value of the controlled variable is adjusted in a conventional manner to the desired value (step S 310). When the controlled variable has reached or essentially reached the desired value, the control device (14 in FIG. 1) is switched off (step S 312), whereby the control operation is interrupted. After the switching-off of the control device 14, in a next step S 314 the deviation Δ of the actual value from the desired value is checked continuously to determine whether it exceeds a defined threshold value. If not, the process reverts to the start of step S 314 and checking is repeated. However, if the difference Δ exceeds the defined threshold, processing returns to step S 310, and the actual value (which then deviates again from the desired value) is again adjusted to the desired value.

By means of the method of operation illustrated in FIG. 3, a control behavior is obtained which is indicated in FIG. 2 in which the actual value is listed with respect to the time. FIG. 2 shows that first the actual value is adjusted to the desired value between a point in time 0 and $t_1$. At the point in time $t_1$, when the actual value has then reached the desired value, the control device 14 is switched off so that the motor 12 is no longer acted upon by an adjusting variable. During the subsequent continuous checking of the difference Δ between the actual value and the desired value, it is determined that the threshold illustrated by a broken line in FIG. 2 is reached or exceeded at a point in time $t_2$.

At the point in time $t_2$, the control device 14 is then activated again, whereby the actual value is again returned to the desired value, which takes place at the point in time $t_3$.

In the time period between $t_3$ and $t_4$, the control device 14 is deactivated again, so that the motor 12 is relieved, and the control device is not activated again until time $t_4$.

Particularly in the case of a slow drift of the actual value, such an approach will be of special interest. The above-mentioned controller application will generally be suitable only when the deviation of the actual value from the desired value within the permitted threshold range causes no disadvantages for the control system and, on the whole, has no negative effects. In this context, an application in which the time periods during which a deactivation of the control device takes place are sufficiently long was found to be favorable, in order to avoid thermal overloading of a motor which is otherwise acted upon in a constant manner.

The present invention also has the advantage that a deactivation can be related directly to the tolerance range, specifically the deviation of the actual and desired value. This ensures independence of tolerances in the mechanism, and of moments of resistance which otherwise may possibly not be taken into account.

FIG. 4 illustrates how the thresholds can be selected in a variable manner as a function of an operating parameter; in this case, the angle of rotation α of the motor. In the example according to FIG. 4, a threshold S1 is selected in an angle range between 0 and 80°. In the angle range between 80° and 140°, a significantly larger threshold S2 is selected, and in the angle range above 140°, a still larger threshold S3 is selected. This means that, according to the angle range, an adaptation of the threshold value can be carried out to vehicle situations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a system, in which a controlled variable is adjusted to a desired value, said method comprising:

adjusting the controlled variable to a value which is substantially equal to the desired value;

interrupting control operation;

checking whether a difference between the controlled variable and the desired value exceeds a predetermined threshold value; and terminating interruption of the control operation when the threshold has been reached or exceeded.

2. The method according to claim 1, wherein said system is an electric drive.

3. The process according to claim 1, wherein said step of adjusting the controlled variable is achieved utilizing a controller which performs control which is one of proportional, integral, derivative, and a combination of proportional, integral and derivative control.

4. The process according to claim 1, wherein the threshold value is dynamically changed.

5. The process according to claim 4, wherein the threshold is changed as a function of at least one vehicle operating parameter.

6. The process according to claim 4, wherein the threshold is found in one of a characteristic curve and a characteristic diagram.

7. The process according to claim 1, wherein:

an electric motor is used as the electric drive; and the electric motor adjusts a valve stroke in a charge cycle valve of an internal-combustion engine.

8. A method of operating a closed loop system for controlling an operating parameter of a controlled system, in which said operating parameter is adjusted as a function of a difference between an actual value of said operating parameter and a target value, said method comprising:

performing closed loop control of said operating parameter until said actual value is substantially equal to said target value;

interrupting said closed loop control, so that said operating parameter is allowed to drift;

determining a difference between said actual value and said target value during continuation of said interruption;

terminating said interruption when said difference reaches a predetermined threshold value.

9. The method according to claim 8, wherein the threshold value is dynamically changed.

10. The method according to claim 9, wherein the threshold is changed as a function of at least one vehicle operating parameter.

* * * * *

UNITED STATES PATENT AND TRADEMARK OFFICE
Certificate

Patent No. 6,541,934 B1                                                                Patented: April 1, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Klaus Hirschfelder, Herbertshausen, Germany; Christian Schmidt, Munich, Germany; and Dr. Martin S. Schaefer, Maisach, Germany.

Signed and Sealed this Second Day of November 2004.

<div align="right">

DAVID MARTIN
*Supervisory Patent Examiner*
Art Unit 2837

</div>